US011019687B2

(12) United States Patent
Picard et al.

(10) Patent No.: US 11,019,687 B2
(45) Date of Patent: May 25, 2021

(54) HEATING DEVICE

(71) Applicant: Ratier-Figeac SAS, Figeac (FR)

(72) Inventors: Pierre-Alex Picard, Figeac (FR); Ludovic Prunet, Themines (FR)

(73) Assignee: RATIER-FIGEAC SAS, Figeac (FR)

( * ) Notice: Subject to any disclaimer, the term of this patent is extended or adjusted under 35 U.S.C. 154(b) by 517 days.

(21) Appl. No.: 15/679,524

(22) Filed: Aug. 17, 2017

(65) Prior Publication Data
US 2018/0054859 A1  Feb. 22, 2018

(30) Foreign Application Priority Data
Aug. 17, 2016 (EP) .................................... 16306064

(51) Int. Cl.
| | | |
|---|---|---|
| H05B 11/00 | (2006.01) | |
| H05B 3/34 | (2006.01) | |
| H05B 3/03 | (2006.01) | |
| F03D 80/40 | (2016.01) | |
| B64D 15/12 | (2006.01) | |
| F01D 25/02 | (2006.01) | |

(52) U.S. Cl.
CPC .............. *H05B 3/342* (2013.01); *H05B 3/03* (2013.01); *H05B 3/347* (2013.01); *B64D 15/12* (2013.01); *F01D 25/02* (2013.01); *F03D 80/40* (2016.05); *F05B 2240/21* (2013.01); *F05D 2240/24* (2013.01); *F05D 2240/303* (2013.01); *H05B 2203/015* (2013.01)

(58) Field of Classification Search
CPC ......... B64D 15/12; F01D 25/02; F03D 80/40; F05B 2240/21; F05D 2240/24; F05D 2240/303; H05B 2203/015; H05B 3/03; H05B 3/342; H05B 3/347

USPC ... 219/200–204, 211–217, 528, 529, 54–549
See application file for complete search history.

(56) References Cited

U.S. PATENT DOCUMENTS

| | | | |
|---|---|---|---|
| 2,503,457 A * | 4/1950 | Speir ...................... | B64D 15/12 219/528 |
| 4,737,618 A * | 4/1988 | Barbier ................... | H05B 3/06 219/520 |
| 6,137,083 A | 10/2000 | Bost et al. | |
| 7,157,663 B1 | 1/2007 | Kismarton | |
| 7,585,156 B2 | 9/2009 | Oldroyd | |
| 7,913,952 B2 | 3/2011 | Boschet et al. | |
| 9,100,994 B2 | 8/2015 | Orawetz et al. | |
| 2006/0278631 A1 | 12/2006 | Lee | |

(Continued)

FOREIGN PATENT DOCUMENTS

| | | |
|---|---|---|
| EP | 2754891 A1 | 7/2014 |
| WO | 2006130454 A2 | 12/2006 |
| WO | 2012159608 A2 | 11/2012 |

OTHER PUBLICATIONS

European Search Report for Application No. 16306064.3-1808 dated Feb. 23, 2017, 7 pages.

*Primary Examiner* — Sang Y Paik

(74) *Attorney, Agent, or Firm* — Cantor Colburn LLP

(57) ABSTRACT

This disclosure provides a heating device. The heating device comprises an electrically conductive fabric and first and second electrical connections. The first and second electrical connections are each connected to the conductive fabric at a first end of the device. When the electrical connections are connected to a power source current flows from the first electrical connection, though the conductive fabric and to the second electrical connection thereby generating heat.

14 Claims, 4 Drawing Sheets

(56) References Cited

U.S. PATENT DOCUMENTS

2007/0278200 A1\* 12/2007 Muromachi ............ H05B 3/86
                                                        219/203
2015/0083863 A1     3/2015 Karthäuser et al.

\* cited by examiner

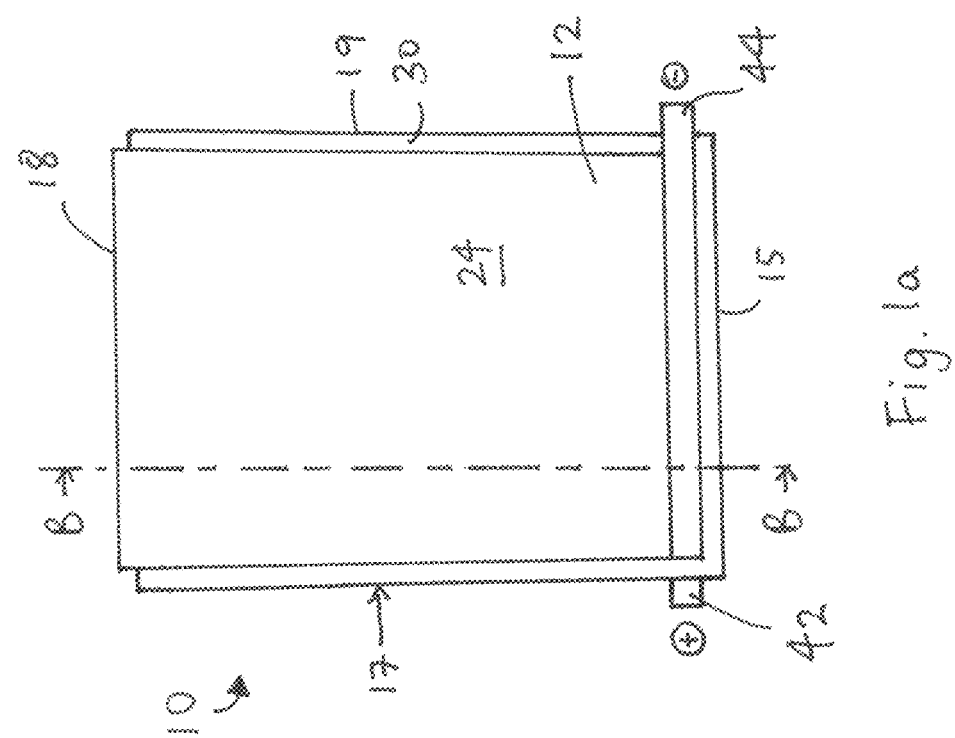
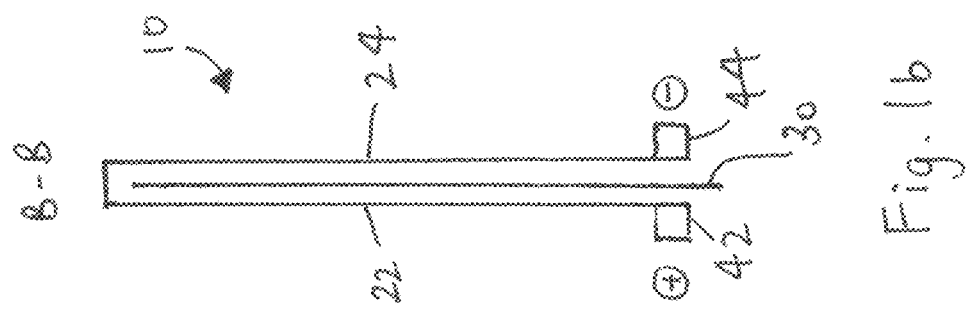

HEATING DEVICE

FOREIGN PRIORITY

This application claims priority to European Patent Application No. 16306064.3 filed Aug. 17, 2016, the entire contents of which is incorporated herein by reference.

TECHNICAL FIELD

The present disclosure relates to heating devices for preventing ice formation on components.

BACKGROUND

In aeronautics or wind turbine products, ice can be a hazardous problem. Anti-icing or de-icing technologies may be fitted on aircraft to avoid ice accretion or remove ice. Existing technologies may be glued onto an aircraft frame and may be subject to erosion, foreign object damage and may interfere with the aerodynamic properties of the component. For rotating parts in particular, components may have complex surface geometry for mounting thereon.

Electrical heating devices are generally made with metallic foil and have power cables at each end (for example root and tip) of the product. In case of impact through the device, the power cable can be cut and the whole heating device rendered out of service. Furthermore foil has low damage tolerance due to the width of the foil path itself. Foil heating devices may be difficult to manufacture as it can be difficult to deform the foil into the complex shapes required, often resulting in defects and high levels of rejected parts.

SUMMARY

From a first aspect, this disclosure provides a heating device. The heating device comprises an electrically conductive fabric and first and second electrical connections. The first and second electrical connections are each connected to the conductive fabric at a first end of the device. When the electrical connections are connected to a power source current flows from the first electrical connection, though the conductive fabric and to the second electrical connection thereby generating heat.

All electrical connections of the heating device may be positioned at the first end of the device.

The conductive fabric may comprise a sheet of fabric folded to provide two plies of conductive fabric connected to each other at a second end of the heating device. The heating device may further comprise an electrically insulating material sandwiched between the two plies.

The electrically insulating material may be a glass fibre sheet. The electrically insulating material may be a flax, hemp or aramid fibre sheet.

The sheet may be folded along a fold line substantially equidistant from first and second ends of the sheet.

The conductive fabric may comprise a first portion and a plurality of legs joined to and extending from the first portion towards the end of the device.

The heating device may comprise at least three legs. Each leg may include an electrical connection at its end.

The legs may be substantially the same length and may be spaced from each other by a gap, the gap being sized to prevent electrical connection between the legs along the length of the legs. In an embodiment, the gap has an equal width along the length of the legs.

The electrically conductive fabric may be a woven fabric incorporating electrically conductive fibres therein. In various embodiments, the electrically conductive material is a carbon fibre material.

The conductive fabric may be formed from a single piece of conductive fabric

A component may comprise a surface prone to ice formation and the heating device as described above mounted to the surface.

The component may be an aeronautic or wind turbine product such as an aeroplane wing, propeller blade, wind turbine blade or fan blade.

The component may be a blade having a root and a tip, the electrical connections of the heating device being positioned adjacent the root of the blade.

The heating device may be mounted to a leading edge of the component.

BRIEF DESCRIPTION OF DRAWINGS

Some embodiments of the disclosure will now be described by way of example only and with reference to the accompanying drawings in which:

FIG. 1a shows a heating device;

FIG. 1b shows a side view of the heating device of FIG. 1a;

FIG. 2a shows the heating device of FIG. 1a in an unfolded configuration;

FIG. 2b shows a side view of the heating device of FIG. 2a;

FIG. 3 shows a blade incorporating the heating device of FIG. 1a;

DETAILED DESCRIPTION

Figures 2A, 2B:
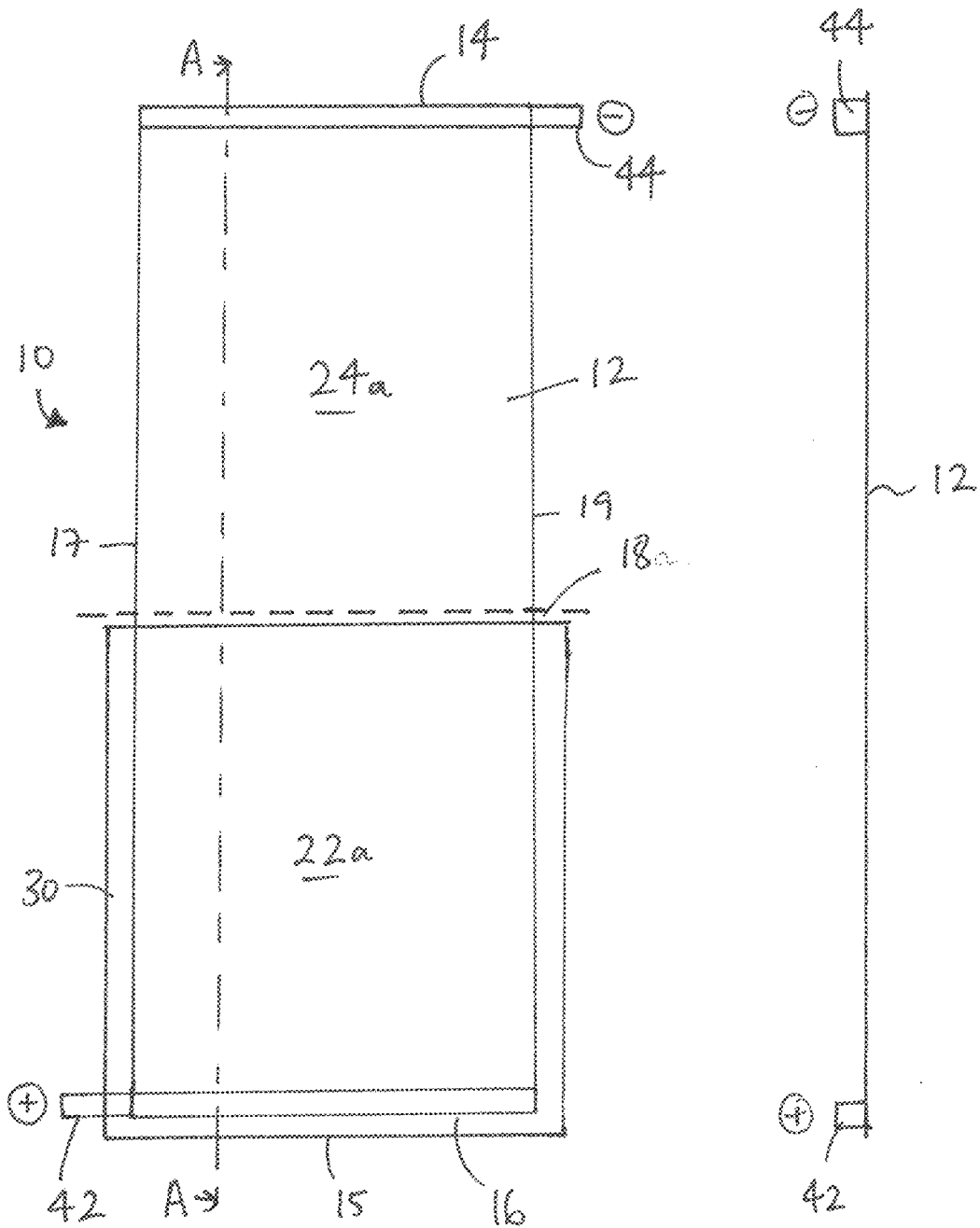

With reference to FIGS. 1a and 1b, an exemplary heating device 10 is illustrated. The heating device 10 has a first end 15, a second, opposed end 18 and two side edges 17 and 19. The heating device 10 also includes a first ply 22 of electrically conductive fabric and a second ply 24 of electrically conductive fabric. The first ply 22 and the second ply 24 are joined at the second end 18 of the heating device 10, as best shown in FIG. 1b. An electrically insulating layer, for example an electrically insulating fabric 30, is positioned between the first ply 22 and the second ply 24 and extends beyond both plies 22, 24 to the first end 15 of the heating device 10. A first electrical connection or terminal 42, such as a power cable is connected to the first ply 22 along the first end 15 of the device 10. A second electrical connection or terminal 44, such as power cable is connected to the second ply 24 along the first end 15 of the device 10.

The plies 22, 24 of the heating device 10 may be formed from a single sheet of electrically conductive, flexible fabric 12 as shown in FIGS. 2a and 2b. The sheet 12 is rectangular in the illustrated embodiment, although it will be appreciated that other shapes may be used for the sheet 12. Power terminals 42, 44 are attached at or adjacent first and second opposed ends 14, 16 of the sheet 12. In the embodiment, the first power terminal 42 is connected to the sheet 12 along the entire second end 16 and the second power terminal 44 is connected to the sheet 12 along the entire first end 14. Other positions of the power cables 42, 44 in the end regions will be appreciated, for example the terminals may be spaced slightly from the ends 14, 16 of the sheet 12 and/or may be attached to just a portion of the ends 14, 16.

The sheet of electrically conductive fabric 12 includes a first part 22*a* which forms the first ply 22 and a second part 24*a* which forms the second ply 24.

The electrically insulating fabric 30 is positioned over the first part 22*a* and the sheet 12 is folded about a fold line 18*a* such that the second part 24*a* is folded over onto the insulating fabric 30. The fold line 18*a* is between the power terminals 42, 44 and spaced therefrom. In the illustrated embodiment the fold line 18*a* is approximately half-way between the two power terminals 42, 44 and parallel thereto. The fold line 18 thus defines equal sized rectangular first and second parts 22*a*, 24*a*. The fold line 18*a* of the sheet 12 thereby forms the second end 18 of the heating device 10, as shown in FIGS. 1*a* and 1*b*. Both power terminals 42, 44 are positioned at or adjacent to the first end 15 of the heating device 10. Alternatively the fold line may be closer to one or other of the power terminals 42, 44 such that folding the sheet 12 results in the terminals 42, 44 being offset from each other in a region adjacent the second end 16.

The electrically conductive fabrics forming the first and second plies 22, 24 are made from the same material, for example a woven carbon fibre material. It will be appreciated that other electrically conductive fabrics may be used such as other woven or non-woven materials, for example incorporating conductive fibres such as metallic fibres or glass fibres having a conductive sheath. In alternative embodiments, the plies 22, 24 may be made from different conductive fabrics which are electrically connected along the second end 18.

The electrically insulating fabric 30 may be formed from glass fibre, although other electrically insulating materials such as flax, hemp or aramid may be used.

Although the illustrated heating device 10 is rectangular, it will be appreciated that the heating device 10 could take other forms depending on the geometry of the area to be heated.

The heating device 10 is deformable due to the use of deformable fabrics for the first and second plies 22, 24 and insulating layer 30. The heating device can therefore easily conform to the shape of the component it is to heat. The use of woven fabrics, in particular, may be stronger and less susceptible to damage than the conventional foil heaters. In an embodiment, the all plies, particularly the first and second plies 22, 24 are formed from a thermo-shapable woven fabric. For a thermo-shapable device, a heating preform may be provided and fitted directly into the component during manufacture. The thermo-shapable embodiment is wrapped on a mould and then heated to fix the shape. The thermo-shapable embodiment is cooled and next removed from mould. The thermo-shapable embodiment is fitted on blade by adhesive, during component co-curing or post bonded after component curing.

The use of fabrics may also provide a heater with relatively low thickness that may be easily incorporated into a component without detrimental effect to the aerodynamics thereof.

Figure 3:
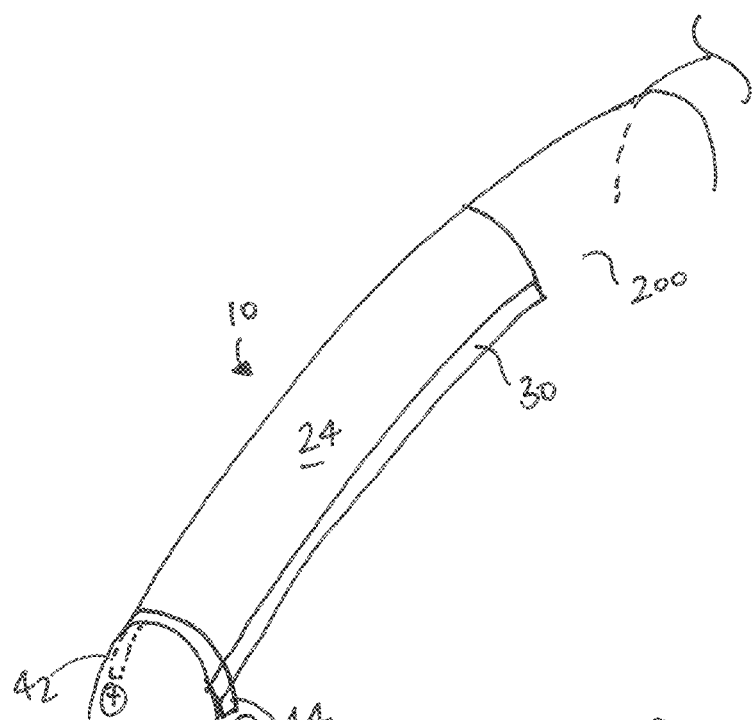

FIG. 3 shows the heating device 10 of FIG. 1*a* mounted to the leading edge of a blade 200, such as a propeller blade. It will be appreciated that the illustrated heating device 10 could also be used to heat other products. In the field of aeronautics, for example, the heating device could be mounted to aircraft wings. The heating device 10 may also be mounted to wind turbine blades and the like, or indeed any to any surface that requires heating.

During use the first and second power terminals 42, 44 are connected to an electrical power source (not shown) such that electric current passes thought the electrically conductive fabric of the first and second plies 22, 24 to form a heating circuit. Heat is dissipated from the heater due to resistive heating of the electrically conductive fabric of the first and second plies 22, 24. The amount of heat energy provided by the heating device 10 may be controlled by adjusting the current in the heating circuit.

In an embodiment, the first and second plies 22, 24 may have different electrical properties or characteristics to one another in order to vary the power density across the device 10 and concentrate heating on a region or surface of the heating device 10. For example, the thickness of the electrically conductive materials, the density of conductive fibres therein or the number of plies of the fabric might be varied.

The heating device 10 may be formed from any number of additional plies 22, 24. For example the sheet 12 forming the device may itself be a multi-ply fabric resulting in multiple plies either side of the insulating material 30 to adapt heating requirement. Alternatively or additionally, the device 10 may be formed from 3 or more plies each being separated from the other plies by a sheet of insulating material 30. Additional plies could have different geometries to provide a desired distribution of heat.

The use of conductive woven fabrics may provide good heating homogeneity over the heating surface of the device.

The heating device is arranged such that both power cables 42, 44 are positioned adjacent the blade root. Having both power cables 42, 44 at one end of the heater 10, particularly adjacent the root, may lower the risk of losing heater function in case of impact at the blade tip.

The large width of the conductive path through both plies 22, 24, improves damage tolerance of the heating device 10, for example if a hole is created in the heating area.

Figure 4:
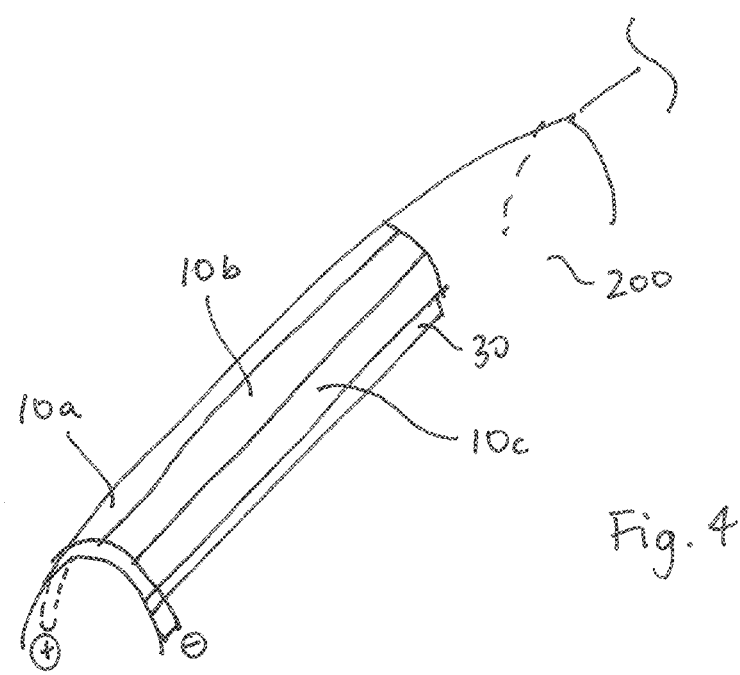
FIG. 4 shows a blade incorporating multiple heating devices.

FIG. 4 shows an alternative configuration of the heating device 12 described above. In particular, FIG. 4 shows a blade 200 incorporating three such heating devices 10*a*, 10*b*, 10*c* arranged adjacent to each other around the leading edge region of the blade 200. Such an arrangement allows the temperature to be varied across the leading edge region of the blade. For example, the current supplied to each heating device 10*a*, 10*b*, 10*c* might be different depending on the heating requirement at that position on the blade. The conductive properties of the fabrics used for each device could also be varied in order to vary heating across the leading edge region of the blade 200. For example, the device positioned at the leading edge might provide the most heat energy. Each heating device 10*a*. 10*b*, 10*c* might have its own power supply or they might each be connected to a common power supply.

Figure 5:
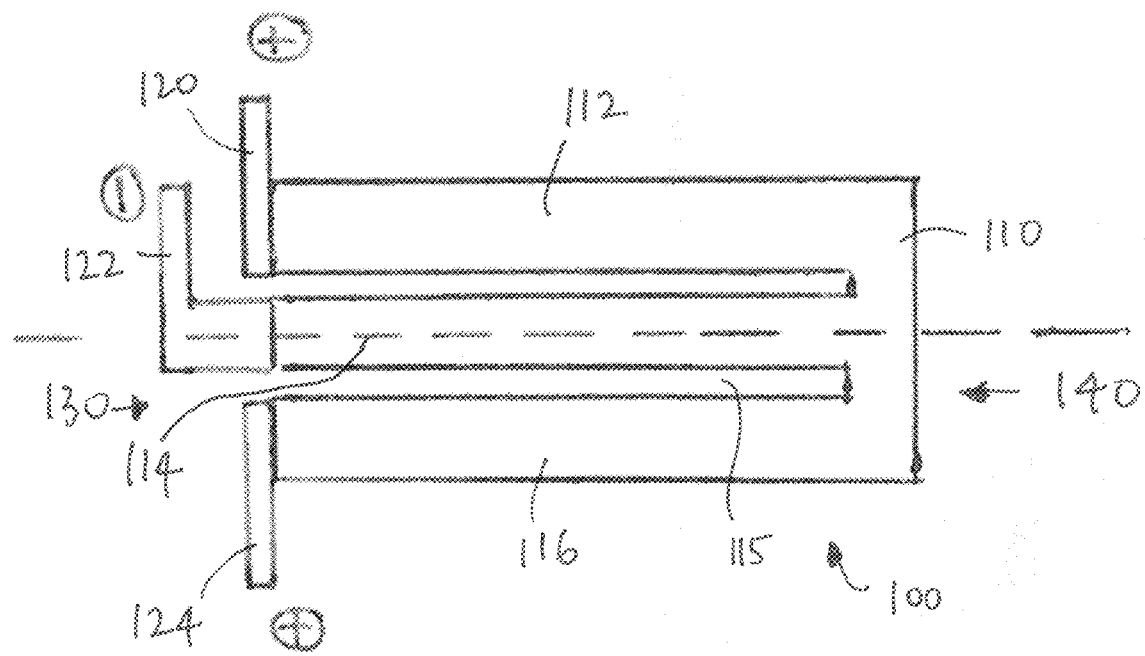
FIG. 5 shows an alternative heating device.

FIG. 5 shows an alternative exemplary heating device 100. The heating device 100 includes a first portion 110 at an end 140 of the heating device 100 and three leg portions 112, 114, 116 extending from the first portion towards an opposed end 130 of the heating device 100. In this embodiment, the legs 112, 114, 116 extend substantially parallel to each other and are approximately equal in width. It will be appreciated, however, that the legs 112, 114, 116 need not be straight or parallel to one another and may have differing widths depending on the heating requirements of the component the heater 100 is to be mounted to.

The device 100 further includes three power terminals 120, 122, 124 attached to the legs 112, 114, 116 adjacent the first end 130 of the device 100. That is each leg has a power terminal connected thereto. In the illustrated embodiment, the central leg 114 is connected to a negative terminal of a power source (not shown) via terminal 122 and the outer legs 112, 116 are connected to positive terminals of the power source via terminals 120, 124 such that current flows from the end of the central leg 114 towards the second end 140 of the device 100, through the first portion 110 and down each of the outer legs 112, 116. In an alternative arrangement the outer legs 112, 116 may be connected to a negative terminal and the central leg 114 may be connected to a positive terminal. In such an arrangement, the current through the device 100 will be reversed.

The first portion 110 and legs 112, 114, 116 of the device 100 are formed from an electrically conductive fabric as described with reference to the embodiment above. In the illustrated example, the device is formed from a single piece of fabric however it will be appreciated that the device may also be formed from multiple pieces of fabric suitably joined together in order to control the conductive properties of the various parts of the device 10 and therefore its heating properties. The device may also be formed from multiple plies of electrically conductive fabric.

Heat is dissipated from the heating device 100 due to resistive heating of the electrically conductive fabric of the first and second plies 22, 24. The amount of heat energy provided by the heating device 10 may be controlled by adjusting the power in the heating circuit.

Figure 6:
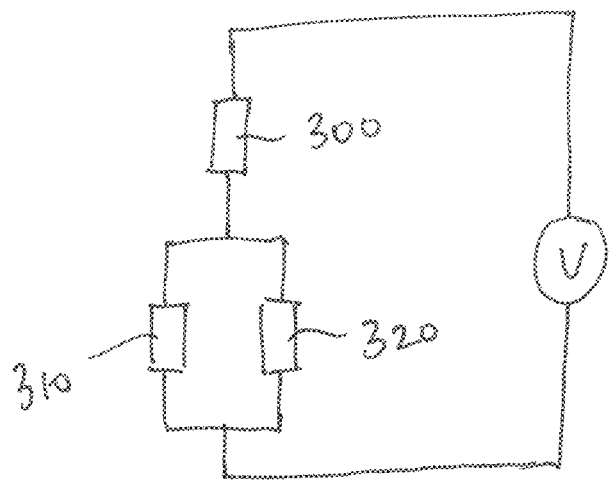
FIG. 6 shows a circuit diagram representing the heating device of FIG. 5.

FIG. 6 shows a circuit diagram of the arrangement of FIG. 5. In which resistors 300, 310, 320 represent the three legs 112, 114, 116 of the device 100 described above. As such, it will be appreciated that the heating of the device 100 may be varied by adjusting the width and resistive properties of the legs. While the illustrated embodiment shows three legs, it will be appreciated that any number of legs could be provided to alter the heating properties thereof.

A heating device 10, 100 according to any of the embodiments above may be attached to a blade using an adhesive.

The heating device 10, 100 might be attached to the outer surface of a blade to form a top layer thereof. Alternatively, the heating device might be coated with a further layer of paint or ice resistant coating or a metallic sheath to further protect the heating device 10, 100 from erosion and foreign object damage. The heating device 10, 100 may alternatively be incorporated into the material of the blade at an earlier stage of manufacture such that it is integrated into the structure of the blade. For example, one or more heating devices 10, 100 may be incorporated into the blade between the two outer plies of the blade shell.

The invention claimed is:

1. A heating device comprising:
an electrically conductive fabric; and
first, second and third electrical connections each connected to the electrically conductive fabric at a first end of the device such that when the electrical connections are connected to a power source current flows from the first electrical connection, through the conductive fabric and to the second and third electrical connections thereby generating heat,
wherein the electrically conductive fabric is formed from a single piece of electrically conductive fabric and comprises a first portion at a second end of the device opposed to the first end, and at least three legs joined to and extending from the first portion to the first end of the device, the at least three legs including the first, second and third electrical connections at respective ends thereof,
wherein a first leg of said at least three legs is connected to a first terminal of a power supply and a second and a third leg of said at least three legs are connected to a second terminal of the power supply, such that current may flow in a direction between the first and second terminals along a path from the first end of the device, along the first leg towards the second end of the device, through the first portion and along each of the second and third legs to the first end of the device thereby generating heat along each of the at least three legs.

2. The heating device of claim 1, wherein the legs are substantially the same length as measured in a direction away from the first portion and between the first end and the second end of the device, and the first leg is spaced from each of the second and third legs by a gap, the gap having an equal width along the length of the legs.

3. The heating device of claim 1, wherein the electrically conductive fabric is a woven fabric incorporating electrically conductive fibres therein.

4. The heating device of claim 1, wherein the electrically conductive fabric is formed from a single piece of electrically conductive fabric.

5. The heating device of claim 1, wherein the first electrical connection is at the end of the first leg and connects the first leg to the first terminal, the second and third electrical connections are at the respective ends of the second and third legs and connect the second and third legs to the second terminal, the first terminal is a negative terminal and the second terminal is a positive terminal such that current can flow along the path in the direction from the first terminal at the first electrical connection at the end of the central leg towards the second end of the device, through the first portion and down each of the outer legs to the second terminal at the second and third electrical connections.

6. The heating device of claim 1, wherein the first terminal is a negative terminal and the second terminal is a positive terminal such that current can flow along the path in the direction from the first terminal at the end of the central leg towards the second end of the device, through the first portion and down each of the outer legs to the second terminal.

7. A component comprising:
a surface prone to ice formation; and
the heating device of claim 1 mounted to the surface.

8. The component of claim 7, wherein the component is an aeronautic or wind turbine product such as an aeroplane wing, propeller blade, wind turbine blade or fan blade.

9. The component of claim 8, wherein the component is a blade having a root and a tip, the electrical connections of the heating device being positioned adjacent the root of the blade.

10. The component of claim 8, wherein the heating device is mounted to a leading edge of the component.

11. The component of claim 7, wherein the component is a blade having a root and a tip, the electrical connections of the heating device being positioned adjacent the root of the blade.

12. The component of claim 11, wherein the heating device is mounted to a leading edge of the component.

13. The component of claim 7, wherein the first electrical connection is at the end of the first leg and connects the first leg to the first terminal, the second and third electrical connections are at the respective ends of the second and third legs and connect the second and third legs to the second terminal, the first terminal is a negative terminal and the second terminal is a positive terminal such that current can flow along the path in the direction from the first terminal at the first electrical connection at the end of the central leg towards the second end of the device, through the first portion and down each of the outer legs to the second terminal at the second and third electrical connections.

14. The component of claim 7, wherein the first terminal is a negative terminal and the second terminal is a positive terminal such that current can flow along the path in the direction from the first terminal at the end of the central leg towards the second end of the device, through the first portion and down each of the outer legs to the second terminal.

* * * * *